United States Patent
Heng (10) Patent No.: US 10,819,764 B2
(45) Date of Patent: *Oct. 27, 2020

(54) SYSTEMS AND METHODS FOR PRESENTING CONTENT STREAMS TO A CLIENT DEVICE

(71) Applicant: Avago Technologies General IP (Singapore) Pte. Ltd., Singapore (SG)

(72) Inventor: Brian Allan Heng, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/948,936

(22) Filed: Apr. 9, 2018

(65) Prior Publication Data
US 2018/0227346 A1 Aug. 9, 2018

Related U.S. Application Data

(63) Continuation of application No. 13/929,702, filed on Jun. 27, 2013, now Pat. No. 9,973,559.

(60) Provisional application No. 61/828,635, filed on May 29, 2013.

(51) Int. Cl.
*H04L 29/06* (2006.01)

(52) U.S. Cl.
CPC ........ *H04L 65/602* (2013.01); *H04L 65/4084* (2013.01)

(58) Field of Classification Search
CPC ........................ H04L 65/602; H04L 65/4084
See application file for complete search history.

(56) References Cited

U.S. PATENT DOCUMENTS

| 6,178,161 | B1 * | 1/2001 | Terry ................ H04L 5/1438 370/276 |
| 6,820,173 | B1 | 11/2004 | Bittel et al. |
| 8,159,960 | B2 | 4/2012 | Cooppan |
| 8,239,895 | B2 | 8/2012 | Park et al. |

(Continued)

FOREIGN PATENT DOCUMENTS

| EP | 2486491 A1 * | 8/2012 | ........... H04L 67/306 |
| WO | WO-2013004260 A1 * | 1/2013 | ......... H04L 65/4084 |

OTHER PUBLICATIONS

"Adaptive bitrate streaming," Wikipedia, retrieved from http://en.wikipedia.org/wiki/Adaptive_bitrate_streaming, visited Oct. 20, 2011.

*Primary Examiner* — Kostas J Katsikis
(74) *Attorney, Agent, or Firm* — Morgan, Lewis & Bockius LLP (57) ABSTRACT

Systems and methods for presenting content streams to a client device are provided. In some aspects, a method includes providing a first manifest file including a list of a number of content streams to a client device. Each of the content streams is associated with the same content being encoded at a different respective bit rate. One or more requests are received for one or more selected content streams to be delivered to a client device. At a gateway, the one or more requests are monitored based on a bit rate associated with the selected content stream. The first manifest file is modified based on the selected content streams to generate a modified manifest file that includes a modified list of content streams corresponding to the selected content streams. The modified manifest file is provided to the client device.

19 Claims, 5 Drawing Sheets

(56) References Cited

U.S. PATENT DOCUMENTS

| | | | |
|---|---|---|---|
| 8,396,983 B1 | 3/2013 | Inskip et al. | |
| 8,752,113 B1* | 6/2014 | Good | H04N 19/40 725/115 |
| 8,769,614 B1* | 7/2014 | Knox | H04L 63/08 726/3 |
| 8,854,958 B2 | 10/2014 | Gell et al. | |
| 9,038,116 B1 | 5/2015 | Knox et al. | |
| 9,042,251 B2* | 5/2015 | Berg | H04L 1/0001 370/252 |
| 9,532,092 B1* | 12/2016 | Suryanarayanan | H04N 21/2662 |
| 9,654,539 B2 | 5/2017 | Falvo | |
| 9,693,118 B2 | 6/2017 | Wan et al. | |
| 2004/0032860 A1* | 2/2004 | Mundra | H04L 12/6418 370/352 |
| 2004/0078293 A1* | 4/2004 | Iverson | G06Q 30/02 705/26.41 |
| 2008/0208949 A1* | 8/2008 | Tanaka | H04L 45/00 709/201 |
| 2010/0235438 A1* | 9/2010 | Narayanan | H04L 65/60 709/203 |
| 2010/0235472 A1* | 9/2010 | Sood | H04L 65/4092 709/219 |
| 2010/0235528 A1* | 9/2010 | Bocharov | H04N 21/6437 709/231 |
| 2010/0318600 A1* | 12/2010 | Furbeck | G06F 17/30997 709/203 |
| 2011/0080940 A1* | 4/2011 | Bocharov | H04N 21/4331 375/240.01 |
| 2011/0082946 A1* | 4/2011 | Gopalakrishnan | H04L 65/4084 709/231 |
| 2011/0093605 A1* | 4/2011 | Choudhury | H04L 65/4084 709/231 |
| 2011/0096828 A1* | 4/2011 | Chen | H04N 21/23106 375/240.02 |
| 2011/0119395 A1* | 5/2011 | Ha | H04L 47/2416 709/231 |
| 2011/0125919 A1 | 5/2011 | Kwon et al. | |
| 2011/0149145 A1* | 6/2011 | Ramos | H04N 21/23439 348/441 |
| 2011/0188439 A1 | 8/2011 | Mao et al. | |
| 2011/0222549 A1 | 9/2011 | Connelly | |
| 2011/0231519 A1* | 9/2011 | Luby | H04N 21/23106 709/219 |
| 2011/0231569 A1* | 9/2011 | Luby | H04N 21/23106 709/234 |
| 2011/0238789 A1* | 9/2011 | Luby | H04L 67/02 709/219 |
| 2011/0239078 A1* | 9/2011 | Luby | H04N 21/234327 714/752 |
| 2011/0296048 A1* | 12/2011 | Knox | H04L 67/2823 709/231 |
| 2011/0302598 A1 | 12/2011 | Lundgren et al. | |
| 2011/0307623 A1* | 12/2011 | George | H04L 65/4084 709/231 |
| 2011/0314130 A1* | 12/2011 | Strasman | H04L 29/06 709/219 |
| 2012/0013746 A1* | 1/2012 | Chen | G11B 27/034 348/180 |
| 2012/0042090 A1* | 2/2012 | Chen | H04L 65/604 709/231 |
| 2012/0096083 A1* | 4/2012 | Teng | H04L 65/4084 709/203 |
| 2012/0233345 A1* | 9/2012 | Hannuksela | H04N 21/26258 709/231 |
| 2012/0243469 A1 | 9/2012 | Klein | |
| 2012/0265856 A1* | 10/2012 | Major | H04N 21/2225 709/219 |
| 2012/0284802 A1* | 11/2012 | Hierro | G06F 21/10 726/27 |
| 2012/0311174 A1* | 12/2012 | Bichot | H04N 21/44209 709/231 |
| 2012/0331293 A1 | 12/2012 | Ma et al. | |
| 2013/0007223 A1* | 1/2013 | Luby | H04N 21/23106 709/219 |
| 2013/0007814 A1 | 1/2013 | Cherian et al. | |
| 2013/0042013 A1 | 2/2013 | Bouazizi | |
| 2013/0060911 A1 | 3/2013 | Nagaraj et al. | |
| 2013/0086279 A1 | 4/2013 | Archer et al. | |
| 2013/0097309 A1 | 4/2013 | Ma et al. | |
| 2013/0109422 A1* | 5/2013 | Xie | H04L 5/0092 455/509 |
| 2013/0163430 A1 | 6/2013 | Gell et al. | |
| 2013/0191550 A1* | 7/2013 | Hannuksela | H04N 21/234327 709/231 |
| 2013/0201844 A1* | 8/2013 | Berg | H04L 1/0019 370/252 |
| 2013/0246578 A1 | 9/2013 | Moreman | |
| 2013/0254341 A1* | 9/2013 | Ramakrishnan | H04L 47/25 709/219 |
| 2013/0260796 A1* | 10/2013 | Hasek | H04L 65/4084 455/456.3 |
| 2013/0275615 A1* | 10/2013 | Oyman | H04L 65/60 709/231 |
| 2013/0282917 A1 | 10/2013 | Reznik et al. | |
| 2013/0286868 A1* | 10/2013 | Oyman | H04L 67/322 370/252 |
| 2013/0290493 A1* | 10/2013 | Oyman | H04W 72/0413 709/219 |
| 2013/0332971 A1* | 12/2013 | Fisher | H04N 21/26258 725/93 |
| 2014/0019635 A1* | 1/2014 | Reznik | H04L 65/607 709/231 |
| 2014/0040959 A1 | 2/2014 | Oyman | |
| 2014/0109153 A1 | 4/2014 | Venkatraman et al. | |
| 2014/0119428 A1* | 5/2014 | Catchpole | H04N 21/47217 375/240.02 |
| 2014/0149557 A1 | 5/2014 | Lohmar et al. | |
| 2014/0156800 A1 | 6/2014 | Falvo | |
| 2014/0189765 A1* | 7/2014 | Green | H04N 21/2365 725/110 |
| 2014/0195651 A1 | 7/2014 | Stockhammer et al. | |
| 2014/0201323 A1* | 7/2014 | Fall | H04L 67/10 709/217 |
| 2014/0204962 A1 | 7/2014 | Park et al. | |
| 2014/0208374 A1* | 7/2014 | Delaunay | H04L 65/605 725/109 |
| 2014/0219088 A1* | 8/2014 | Oyman | H04N 21/23439 370/231 |
| 2014/0222962 A1 | 8/2014 | Mao et al. | |
| 2014/0223502 A1* | 8/2014 | Doblmaier | H04N 21/4384 725/93 |
| 2014/0229529 A1 | 8/2014 | Barone et al. | |
| 2014/0258552 A1* | 9/2014 | Oyman | H04N 19/146 709/231 |
| 2014/0269366 A1* | 9/2014 | Torgersrud | H04L 65/605 370/252 |
| 2014/0281002 A1* | 9/2014 | Sun | H04L 29/06455 709/231 |
| 2014/0281007 A1* | 9/2014 | Lemmons | H04N 21/2355 709/231 |
| 2014/0281009 A1 | 9/2014 | Moorthy et al. | |
| 2014/0317234 A1 | 10/2014 | Mueller et al. | |
| 2014/0317241 A1 | 10/2014 | Zhao et al. | |
| 2014/0344443 A1* | 11/2014 | MacInnis | H04L 43/08 709/224 |
| 2014/0351383 A1* | 11/2014 | Wan | H04L 65/605 709/219 |
| 2014/0351385 A1* | 11/2014 | Li | H04L 65/601 709/219 |
| 2014/0355625 A1* | 12/2014 | Chen | H04L 65/605 370/468 |
| 2014/0359076 A1 | 12/2014 | Wan et al. | |
| 2014/0359152 A1* | 12/2014 | Heng | H04L 65/602 709/231 |
| 2015/0012929 A1 | 1/2015 | Huber | |
| 2015/0016251 A1 | 1/2015 | Gell et al. | |

(56) References Cited

U.S. PATENT DOCUMENTS

| | | | |
|---|---|---|---|
| 2015/0026309 A1* | 1/2015 | Radcliffe | H04L 65/602 709/219 |
| 2015/0032899 A1* | 1/2015 | Willars | H04L 65/4076 709/231 |
| 2015/0070585 A1* | 3/2015 | Sharif-Ahmadi | G08C 17/02 348/564 |
| 2015/0074733 A1* | 3/2015 | Manchester | H04N 21/23439 725/93 |
| 2015/0082345 A1* | 3/2015 | Archer | H04L 65/605 725/34 |
| 2015/0089026 A1* | 3/2015 | Payette | H04L 67/141 709/219 |
| 2015/0127778 A1* | 5/2015 | De Vleeschauwer | H04N 21/23439 709/219 |
| 2015/0127848 A1* | 5/2015 | Houdaille | H04L 65/4084 709/233 |
| 2015/0134784 A1* | 5/2015 | De Vleeschauwer | H04L 65/605 709/219 |
| 2015/0163273 A1* | 6/2015 | Radcliffe | H04L 65/602 709/231 |
| 2015/0215359 A1 | 7/2015 | Bao et al. | |
| 2015/0341404 A1* | 11/2015 | Xiong | H04L 65/4084 709/231 |
| 2016/0050241 A1* | 2/2016 | Lotfallah | H04L 67/2804 709/219 |
| 2016/0247383 A1* | 8/2016 | Kassab | H04W 4/08 |
| 2016/0248884 A1 | 8/2016 | Larabi et al. | |
| 2017/0111425 A1 | 4/2017 | Gell et al. | |
| 2017/0244772 A1 | 8/2017 | Falvo | |
| 2018/0316736 A1* | 11/2018 | Lotfallah | H04L 67/2804 |

\* cited by examiner

SYSTEMS AND METHODS FOR PRESENTING CONTENT STREAMS TO A CLIENT DEVICE

CROSS-REFERENCES TO RELATED APPLICATIONS

This application is a continuation of application Ser. No. 13/929,702, filed on Jun. 27, 2013, now U.S. Pat. No. 9,973,559, which claims the benefit of U.S. Provisional Application No. 61/828,635, filed on May 29, 2013, the entirety of each of which is incorporated herein by reference for all purposes.

FIELD

The subject technology generally relates to content streams and, in particular, relates to systems and methods for presenting content streams to a client device.

BACKGROUND

Adaptive bit rate streaming is a technique used in streaming multimedia over networks. It involves detecting a user device's bandwidth and central processing unit (CPU) capacity in real time, and adjusting the quality of a multimedia stream accordingly. An encoder, for example, may be used to encode a single multimedia source at multiple bit rates. The user device may switch between streaming the different encodings depending on available resources. As a result, adaptive bit rate streaming requires little to no buffering, has fast start times, and can be used for both high-end and low-end connections.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

Figure 1:
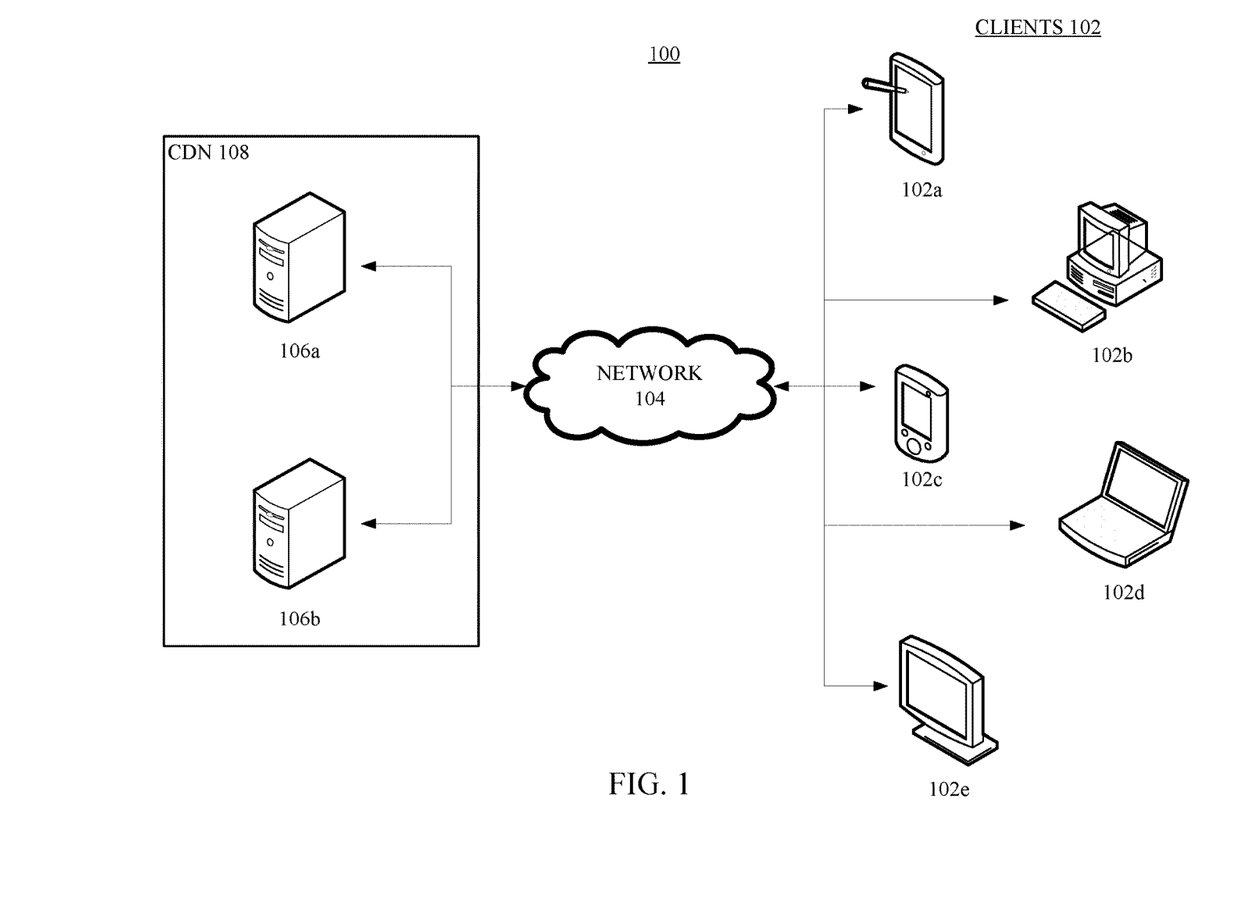
FIG. 1 illustrates an example of an environment in which adaptive bit rate streaming may be used, in accordance with various aspects of the subject technology.

FIG. 1 illustrates an example of environment 100 in which adaptive bit rate streaming may be used, in accordance with various aspects of the subject technology. Environment 100 includes content delivery network (CDN) 108 and client devices 102 (e.g., client devices 102a, 102b, 102c, 102d, and 102e). CDN 108 includes servers 106 (e.g., servers 106a and 106b). One goal of CDN 108 is to serve content to client devices 102 with high availability and high performance. In some aspects, the phrase "content delivery network," as used herein, encompasses its plain and ordinary meaning (e.g., as understood by those of ordinary skill in the art). In some aspects, the phrase "content delivery network," as used herein, refers to any entity that delivers content (e.g., a cable head-end that delivers content as an analog and/or a digital cable transmission, a satellite television provider that delivers content as a satellite transmission, any one or more devices that deliver content to another device, etc.).

As shown in FIG. 1, CDN 108 and client devices 102 are connected over network 104. Network 104 can include, for example, any one or more of a personal area network (PAN), a local area network (LAN), a campus area network (CAN), a metropolitan area network (MAN), a wide area network (WAN), a broadband network (BBN), a peer-to-peer network, an ad-hoc network, the Internet, and the like. Further, network 104 can include, but is not limited to, any one or more network topologies such as a bus network, a star network, a ring network, a mesh network, a star-bus network, tree or hierarchical network, and the like.

Client devices 102 and servers 106 can be any electronic device having processing hardware, memory, and communications capability necessary to perform some or all of the operations disclosed herein. Client devices 102, for example, can be desktop computers (e.g., client device 102b), mobile computers (e.g., client device 102d), tablet computers (e.g., client device 102a), mobile devices (e.g., smartphones or personal digital assistants such as client device 102c), set top boxes (e.g., including televisions with one or more processors coupled thereto and/or embedded therein, such as client device 102e), video game consoles, or any other electronic devices having memory, processing hardware, and communications capabilities for receiving content from servers 106. Servers 106 may be adaptive bit rate (ABR) servers that provide content over network 104 to client devices 102.

Figure 2:
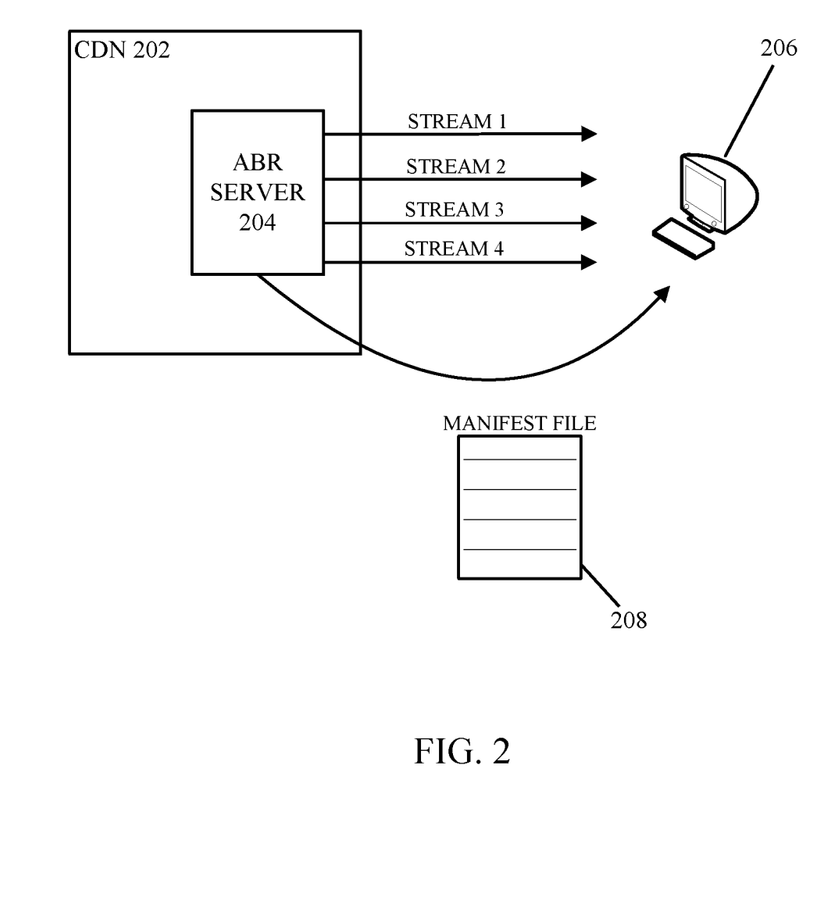
FIG. 2 illustrates an example of an adaptive bit rate server providing content to a particular client device, in accordance with various aspects of the subject technology.

FIG. 2 illustrates an example of ABR server 204 providing content to a particular client device 206, in accordance with various aspects of the subject technology. As shown in FIG. 2, ABR server 204 is part of CDN 202. In an adaptive bit rate streaming system, ABR server 204 may deliver content, such as video and/or audio, to client device 206 in different content streams (e.g., shown in FIG. 2 as stream 1, stream 2, stream 3, and stream 4). Each of these streams may comprise a different version of the content. For example, each stream may comprise one or more segments of the content (e.g., each segment may have a duration of 2-10 seconds). The segments of one stream may be a different variant of the segments of another stream (e.g., segments from different streams may be encoded at different bit rates). Providing different versions of the content to client device 206 allows client device 206 to receive the content in a way that is most appropriate for itself. For example, client device 206 may select a stream at a bit rate that it is capable of receiving based on its computing resources and available bandwidth.

ABR server 204 may determine the particular streams that client device 206 is likely able to receive and may advertise these streams as being available to the client device. When advertising to client device 206, ABR server 204 may rank these streams in order from the highest bit rates available to the lowest bit rates available, thereby prioritizing the streams according to bit rates. For example, ABR server 204 may generate, and send to client device 206, manifest file 208 that lists the available streams in their ranked order, the different bit rates at which each of these streams has been encoded, and a network identifier for accessing each segment of a corresponding stream (e.g., a uniform resource locator (URL)). Thus, manifest file 208 provides an indication to client device 206 of which streams are available according to bit rates.

Client device 206 may retrieve each stream at the bit rate that is appropriate for itself (e.g., based on network bandwidth conditions that are determinable by client device 206). In this manner, client device 206 may adaptively retrieve streams that are encoded at different bit rates in accordance with changing network bandwidth conditions.

Figure 3:
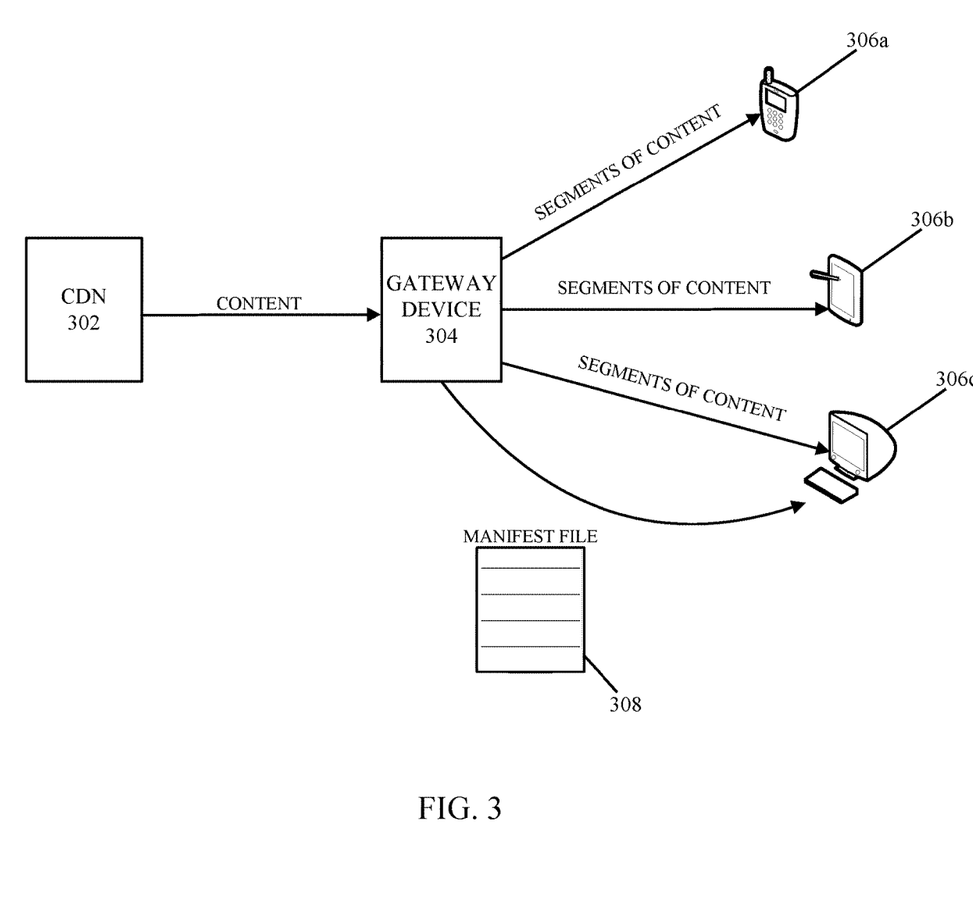
FIG. 3 illustrates an example of a gateway device placed between a content delivery network and client devices, in accordance with various aspects of the subject technology.

In some aspects, a gateway device may be placed between a CDN and one or more client devices to facilitate communications between the CDN and the one or more client devices. FIG. 3 illustrates an example of gateway device 304 placed between CDN 302 and client devices 306 (e.g., client devices 306a, 306b, and 306c), in accordance with various aspects of the subject technology. Gateway device 304, for example, may be a set top box in a home that receives content from CDN 302 and distributes the content to different client devices 306 within the home. However, gateway device 304 may be a device that receives content and distributes it to different client devices in any suitable network.

According to certain aspects, gateway device 304 may receive a single stream of the content from CDN 302. For example, such a stream may be a high quality stream of content (e.g., highest resolution available, highest bit rate available, etc.). In one or more implementations, the single stream may be a non-segment-based stream of content, such as a quadrature amplitude modulation (QAM) stream of content from CDN 302. However, it is understood that the single stream of content may be a stream of content in any suitable format.

Gateway device 304 may also receive a plurality of streams of the content from CDN 302. In some aspects, at least one of these streams may be a single high quality stream of content as discussed above. In some aspects, some or all of the plurality of streams may be segment-based streams of the content, such as the ABR streams as discussed with respect to FIG. 2. In such a situation, CDN 302 may utilize adaptive bit rate streaming to provide the content to gateway device 304, which may serve as a client device relative to CDN 302. For example, CDN 302 may provide gateway device 304 with a manifest file that lists available streams. Gateway device 304 may request from CDN 302 one or more of the available streams listed in the manifest file, and receive the requested streams from CDN 302.

Upon receiving the content from CDN 302, gateway device 304 may distribute the content to client devices 306. In some aspects, gateway device 304 may distribute a single stream of the content to each client device 306. In some aspects, gateway device 304 may distribute a plurality of streams of the content to each client device 306. These streams, for example, may include one or more non-segment-based streams of content (such as a single high quality stream of content) and/or one or more segment-based streams of content (such as the ABR streams as discussed with respect to FIG. 2).

As shown in FIG. 3, gateway device 304 may advertise and provide multiple segment-based streams of the content for each client device 306. In this situation, gateway device 304 may serve as an adaptive bit rate server (e.g., relative to client devices 306) and utilize adaptive bit rate streaming to provide the content to each client device 306. For example, gateway device 304 may provide client device 306c manifest file 308 that lists available streams, receive a request from client device 306c for one or more of the available streams listed in manifest file 308, and provide the requested streams to client device 306c.

However, network bandwidth conditions may change such that a client device may wish to retrieve a stream that is not listed in a manifest file. According to various aspects of the subject technology, systems and methods are provided for determining whether a manifest file needs to be updated to more accurately list streams that a client device is able to retrieve. In one or more implementations, an adaptive bit rate server may monitor requests from a client device for streams that are listed in a manifest file. If the client device consistently requests a particular stream, such as a stream associated with the highest or lowest available bit rate, the adaptive bit rate server may infer that the client device is able to support a stream with a bit rate that is either higher or lower than what is listed in the manifest file. As a result, the adaptive bit rate server may modify the manifest file to include streams with higher or lower bit rates. If the streams with higher or lower bit rates are not already available to the adaptive bit rate server (e.g., the adaptive bit rate server may be a gateway device that receives streams of the content from a CDN in different bit rates), the adaptive bit rate server may transcode the streams received from the CDN into the appropriate bit rates.

Figure 4:
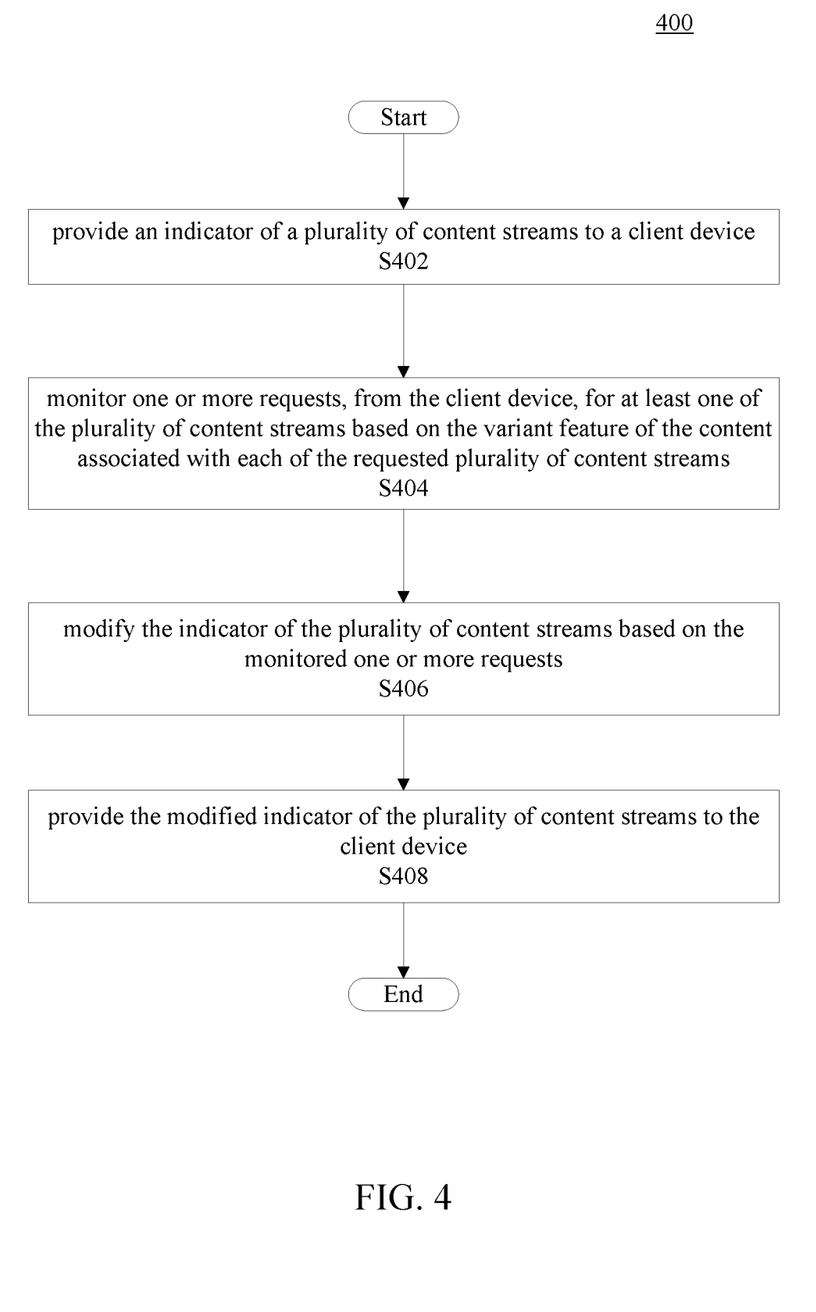
FIG. 4 illustrates an example of a method for presenting content streams to a client device, in accordance with various aspects of the subject technology.

FIG. 4 illustrates an example of method 400 for presenting content streams to a client device, in accordance with various aspects of the subject technology. Method 400 is described herein with reference to FIG. 3. However, method 400 is not limited to the examples presented in FIG. 3. Furthermore, although method 400 is illustrated in the order shown in FIG. 4, it is understood that method 400 may be implemented in a different order.

According to S402, gateway 304 provides an indicator of a plurality of content streams to client device 306c in order to advertise what streams are available to client device 306c. The indicator of the plurality of content streams, for example, may be manifest file 308 that lists the plurality of content streams. Each of these streams may be associated with a variant feature of the content to be delivered to client device 306c. The variant feature may include a bit rate and/or a non-bit rate feature of the content. According to certain aspects, the variant features of the streams may be different from one another (e.g., each stream may be associated with a unique combination of a bit rate and a non-bit rate feature). In one or more implementations, the non-bit rate feature may be a codec that the content is encoded with (e.g., Moving Picture Experts Group (MPEG), advanced video coding (AVC), high efficiency video coding (HEVC), etc.), a frame rate of the content (e.g., 30 frames per second (fps), 60 fps, etc.), a resolution of the content (e.g., 1920× 1080 pixels, 1280×720 pixels, etc.), a format of the content (e.g., progressively scanned, interlaced, etc.), and/or another suitable feature. For example, a non-bit rate feature may be any feature that helps provides an objective and/or subjective indication of whether a particular stream is better in quality (or is otherwise more desirable) than another stream.

In one or more implementations, the listing of the streams in manifest file 308 may be ranked according to the variant feature of the content. For example, the streams may be ranked in order from a stream associated with a highest bit rate to a stream associated with a lowest bit rate. For the purposes of illustration, assume that manifest file 308 lists the streams in the following order: stream A with a bit rate of 20 megabits per second (mbps), stream B with a bit rate of 15 mbps, stream C with a bit rate of 10 mbps, and stream D with a bit rate of 5 mbps.

According to S404, gateway device 304 monitors one or more requests, from client device 306c, for at least one of the listed streams based on the variant feature of the content associated with each stream. In one or more implementations, gateway device 304 may identify a predetermined number of requests from client device 306c for one or more particular streams ranked in a top half of the listing (e.g., one or more streams with the highest bit rates, such as stream A) or for one or more particular streams ranked in the bottom half of the listing (e.g., one or more streams with the lowest bit rates, such as stream D). The predetermined number of requests, for example, may be a consecutive number of requests and may allow gateway device 304 to determine how consistently client device 306c requests the particular one or more streams.

For example, if client device 306c requests stream A (e.g., the stream with the highest available bit rate) at the predetermined number of times, then gateway device 304 may determine that client device 306c has consistently requested stream A. Gateway device 304 may therefore determine that client device 306c is able to support a stream with a bit rate that is even higher than that of stream A's.

Alternatively, if client device 306c requests stream D (e.g., the stream with the lowest available bit rate) at the predetermined number of times, then gateway device 304 may determine that client device 306c has consistently requested stream D. Gateway device 304 may therefore determine that client device 306c may prefer to receive a stream with a bit rate that is even lower than that of stream D's since the currently listed streams may have bit rates that client device 306c may not be able to support. The predetermined number may be any suitable number that will allow gateway device 304 to determine that client device 306c has consistently requested one or more particular streams (e.g., such as 10, or any other number that may be greater or lower).

Although the foregoing examples describe client device 306c as consistently requesting either the highest ranked stream (e.g., stream A) or the lowest ranked stream (e.g., stream D), it is understood that client device 306c may consistently request a stream ranked between the highest ranked stream and the lowest ranked stream. In such a situation, gateway device 304 may determine that client device 306c is not able to support any of the currently listed streams other than the consistently requested stream. As a result, gateway device 304 may determine that client device 306c prefers a list of streams with bit rates that are closer to the bit rate of the consistently requested stream (e.g., to provide finer granularity options). For example, if client device 306c requests stream B (e.g., the stream with a bit rate of 15 mbps) at the predetermined number of times, then gateway device 304 may determine that client device 306c has consistently requested stream B. Gateway device 304 may therefore determine that client device 306c may prefer a list that has a stream with a bit rate that is higher than that of stream C's and/or lower than that of stream A's (e.g., since the currently listed streams, other than stream B, may have bit rates that client device 306c may not be able to support).

According to S406, gateway device 304 modifies the indicator of the plurality of content streams based on the monitored one or more requests. For example, if gateway device 304 identifies the predetermined number of requests for stream A from client device 306c, gateway device 304 may modify manifest file 308 by adding to manifest file 308 a stream that has a bit rate higher than that of stream A's (e.g., a stream with a bit rate higher than 20 mbps). Thus, the modified manifest file 308 may include a stream with an even higher bit rate that that client device 306c may be able to receive. In one or more implementations, gateway device 304 may also modify manifest file 308 by removing at least one of the lower ranked streams that client device 306 may not need to receive since it is able to receive streams with higher bit rates. For example, gateway device 304 may remove stream D from manifest file 308.

Alternatively, if gateway device 304 identifies the predetermined number of requests for stream D from client device 306c, gateway device 304 may modify manifest file 308 by adding to manifest file 308 a stream that has a bit rate lower than that of stream D's (e.g., a stream with a bit rate lower than 5 mbps). Thus, the modified manifest file 308 may include a stream with an even lower bit rate that that client device 306c may prefer to receive. In one or more implementations, gateway device 304 may also modify manifest file 308 by removing at least one of the higher ranked streams that client device 306 may not be able to receive since it is consistently requesting the lowest ranked stream. For example, gateway device 304 may remove stream A from manifest file 308.

In some aspects, if gateway device 304 identifies the predetermined number of requests for stream B from client device 306c, gateway device 304 may modify manifest file 308 by adding to manifest file 308 a stream that has a bit rate higher than that of stream C's (e.g., a stream with a bit rate higher than 10 mbps) and/or a stream that has a bit rate lower than that of stream A's (e.g., a stream with a bit rate lower than 20 mbps). Thus, the modified manifest file 308 may include streams that have bit rates that are closer to the bit rate of stream B. In one or more implementations, gateway device 304 may also modify manifest file 308 by removing at least one of the higher ranked streams and/or lower ranked streams that client device 306 may not be able to receive since it is consistently requesting a middle ranked stream. For example, gateway device 304 may remove stream A, stream C, and/or stream D from manifest file 308.

According to S408, gateway device 304 provides the modified indicator of the plurality of content streams to client device 306c. For example, gateway device 304 may provide the modified manifest file 308 to client device 306c, thereby allowing gateway device 304 to advertise different streams that client device 306 may prefer to receive compared to the streams listed in the original manifest file 308.

Although gateway device 304 is described as monitoring requests based on the bit rates of the streams, it is understood that gateway device 304 may monitor requests based on other non-bit rate features. In one or more implementations, gateway device 304 may identify a predetermined number of requests from client device 306c for one or more streams having a particular non-bit rate feature. For the purposes of illustration, assume that manifest file 308 lists the following streams: stream A with a bit rate of 20 megabits per second (mbps) and encoded in AVC, stream B with a bit rate of 15 mbps and encoded in AVC, stream C with a bit rate of 10 mbps and encoded in MPEG-2, and stream D with a bit rate of 5 mbps and encoded in MPEG-2.

If client device 306c requests stream A or stream B (e.g., the streams encoded in AVC) at the predetermined number of times, then gateway device 304 may determine that client device 306c has consistently requested these streams. Gateway device 304 may therefore determine that client device 306c is able to support a stream encoded in AVC, and may not necessarily need and/or prefer to support streams encoded in lower quality codecs, such as MPEG-2. Thus, gateway device 304 may modify manifest file 308 by adding more streams encoded in AVC and/or removing one or more streams encoded in codecs that are not AVC (e.g., stream C and stream D, which are encoded in MPEG-2).

Figure 5:
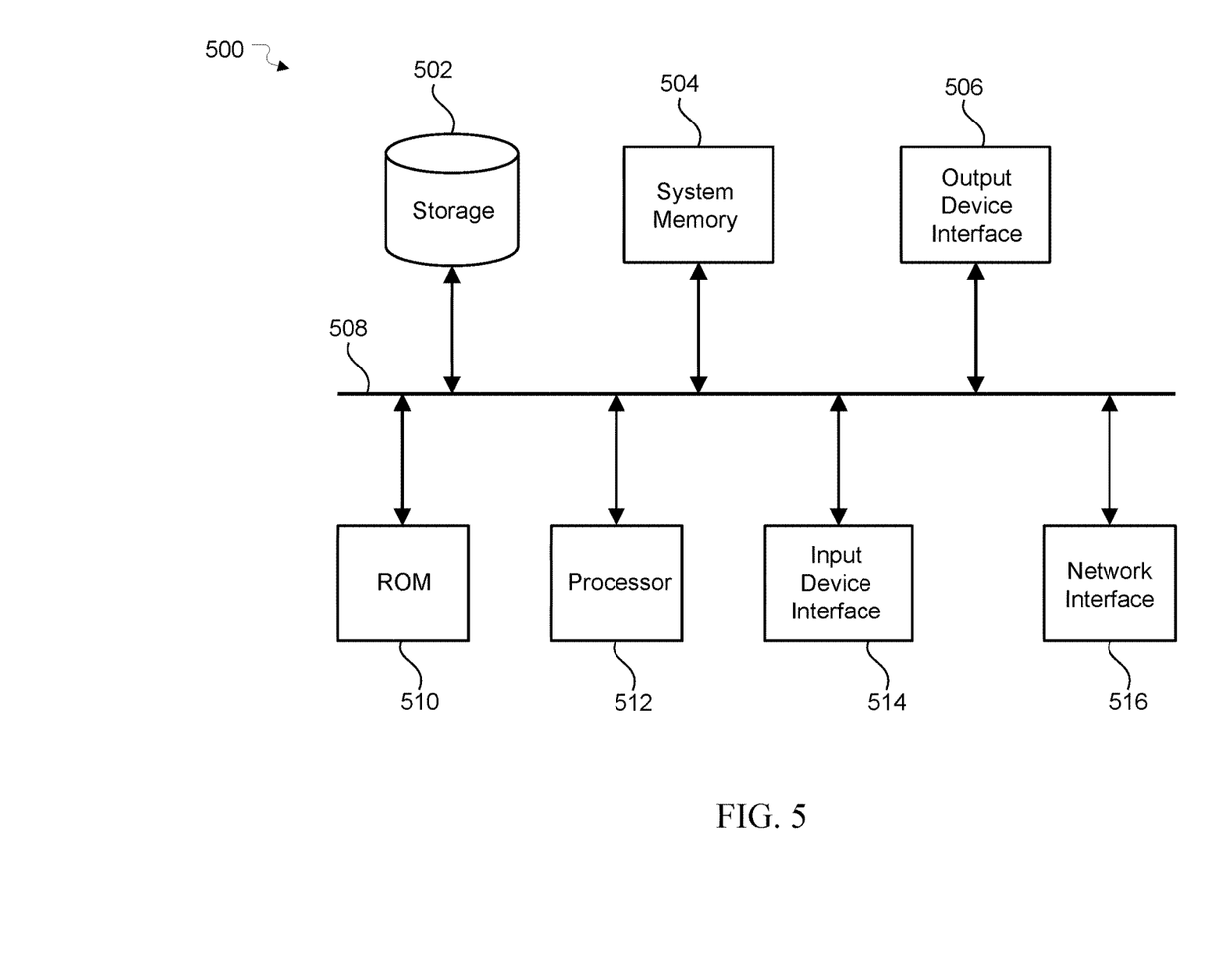
FIG. 5 conceptually illustrates an electronic system with which aspects of the subject technology may be implemented.

FIG. 5 conceptually illustrates electronic system 500 with which aspects of the subject technology may be implemented. Electronic system 500, for example, can be a desktop computer, a laptop computer, a tablet computer, a server, a switch, a router, a base station, a receiver, a phone, a personal digital assistant (PDA), a gateway device, any device that presents content streams to a client device, or generally any electronic device that transmits signals over a network. Such an electronic system includes various types of computer readable media and interfaces for various other types of computer readable media. Electronic system 500 includes bus 508, processing unit(s) 512, system memory 504, read-only memory (ROM) 510, permanent storage device 502, input device interface 514, output device interface 506, and network interface 516, or subsets and variations thereof.

Bus 508 collectively represents all system, peripheral, and chipset buses that communicatively connect the numerous internal devices of electronic system 500. In one or more implementations, bus 508 communicatively connects processing unit(s) 512 with ROM 510, system memory 504, and permanent storage device 502. From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. One or more implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores any of the instructions and data that processing unit(s) 512 needs at runtime. In one or more implementations, the processes of the subject disclosure are stored in system memory 504, permanent storage device 502, and/or ROM 510. From these various memory units, processing unit(s) 512 retrieves instructions to execute and data to process in order to execute the processes of one or more implementations.

Bus 508 also connects to input and output device interfaces 514 and 506. Input device interface 514 enables a user to communicate information and select commands to the electronic system. Input devices used with input device interface 514 include, for example, alphanumeric keyboards and pointing devices (also called "cursor control devices"). Output device interface 506 enables, for example, the display of images generated by electronic system 500. Output devices used with output device interface 506 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, bus 508 also couples electronic system 500 to a network (not shown) through network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While one or more implementations described herein may be software processes executed by microprocessors or multi-core processors, the one or more implementations may also be performed by one or more integrated circuits, such as application specific integrated circuits (ASICs) or field programmable gate arrays (FPGAs). Such integrated circuits, for example, may execute instructions that are stored on the circuit itself.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to analyze and control an operation or a component may also mean the processor being programmed to analyze and control the operation or the processor being operable to analyze and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A computer program product comprising instructions stored in a tangible non-transitory computer-readable medium, the instructions comprising:

instructions for providing a first manifest file including a list of a plurality of content streams to a client device, wherein each of the plurality of content streams is associated with a same content being encoded at a different respective bit rate;

instructions for receiving one or more requests for one or more selected content streams from the plurality of content streams to be delivered to the client device;

instructions for monitoring, at a gateway, the one or more requests based on a bit rate associated with the selected content stream of the one or more selected content streams to identify a client-desired bit rate;

instructions for modifying the first manifest file based on the selected content streams and the identified client-desired bit rate to generate a modified manifest file that includes a modified list of content streams corresponding to the selected content streams and the client-desired bit rate; and instructions for providing the modified manifest file to the client device, wherein the plurality of content streams is ranked in order from a content stream associated with a highest bit rate to a content stream associated with a lowest bit rate.

2. The computer program product of claim 1, wherein the instructions comprise:
  instructions for generating the modified manifest file by one of removing certain content streams from a list of content streams in the first manifest file or adding additional content streams encoded at different respective bit rates than content streams listed in the first manifest file.

3. The computer program product of claim 2, wherein the instructions comprise:
  instructions for transcoding one or more content streams listed in the first manifest file to generate the additional content streams encoded at different respective bit rates for the modified manifest file.

4. A method for presenting a manifest file to a client device, the method comprising:
  providing a first manifest file including a list of a plurality of content streams to the client device, wherein each of the plurality of content streams is associated with a same content being encoded at a different respective bit rate;
  receiving one or more requests for one or more selected content streams from the plurality of content streams to be delivered to the client device;
  monitoring, at a gateway, the one or more requests based on a combination of a codec characteristic and a bit rate associated with a selected content stream of the one or more selected content streams to identify a client-desired combination of codec characteristic and bit rate;
  modifying the first manifest file based on the selected content streams and the identified client-desired combination of codec characteristic and bit rate to generate a modified manifest file that includes a modified list of content streams corresponding to the selected content streams and the client-desired combination of codec characteristic and bit rate; and
  providing the modified manifest file to the client device, wherein the plurality of content streams is ranked in order from a content stream associated with a highest bit rate to a content stream associated with a lowest bit rate.

5. The method of claim 4, further comprising generating the modified manifest file to include content streams with bit rates closer to the selected content streams.

6. The method of claim 4, further comprising generating the modified manifest file by removing certain content streams from a list of content streams in the first manifest file.

7. The method of claim 4, wherein monitoring the one or more requests comprises identifying a predetermined number of consecutive requests from the client device for a second content stream of the plurality of content streams ranked in a bottom half of a ranked listing or a third content stream of the plurality of content streams ranked between a first content stream and the second content stream.

8. The method of claim 7, wherein the first content stream is a highest ranked one of the plurality of content streams, and wherein the second content stream is a lowest ranked one of the plurality of content streams.

9. The method of claim 7, wherein the predetermined number of the consecutive requests is for the first content stream, and wherein the method further comprises:
  identifying the predetermined number of the consecutive requests for the first content stream, and
  modifying the manifest file by adding to the ranked listing a content stream ranked higher than the first content stream.

10. The method of claim 9, wherein, if the predetermined number of the consecutive requests for the first content stream is identified, modifying the manifest file by removing from the ranked listing the second content stream.

11. The method of claim 7, wherein the predetermined number of the consecutive requests is for the second content stream, and the method further comprises:
  identifying the predetermined number of the consecutive requests for the second content stream, and
  modifying the manifest file by adding to the ranked listing a content stream ranked lower than the second content stream.

12. The method of claim 11, wherein, if the predetermined number of the consecutive requests for the second content stream is identified, modifying the manifest file by removing from the ranked listing the first content stream.

13. The method of claim 7, wherein the predetermined number of the consecutive requests is for the third content stream, and the method further comprises:
  identifying the predetermined number of the consecutive requests for the third content stream, and
  modifying the manifest file by adding to the ranked listing at least one of i) a content stream ranked lower than the first content stream and ii) a content stream ranked higher than the second content stream.

14. The method of claim 13, wherein, if the predetermined number of the consecutive requests for the third content stream is identified, modifying the manifest file by removing from the ranked listing at least one of the first content stream and the second content stream.

15. The method of claim 4, further comprising generating the modified manifest file by adding additional content streams encoded at different respective bit rates than content streams listed in the first manifest file.

16. The method of claim 15, further comprising transcoding one or more content streams listed in the first manifest file to generate the additional content streams encoded at different respective bit rates for the modified manifest file.

17. A system comprising:
  memory comprising instructions for presenting a manifest file to a client device; and
  a processor configured to execute the instructions to:
  provide the manifest file including a list of a plurality of content streams to the client device, wherein each of the plurality of content streams is associated with a same content being encoded at a different respective bit rate;
  receive from the client device one or more requests for one or more selected content streams from the plurality of content streams to be delivered to the client device;
  monitor, at a gateway, the one or more requests based on a bit rate associated with a selected content stream of the one or more selected content streams to identify a client-desired bit rate;
  modify the manifest file based on the on the selected content streams and the identified client-desired bit rate to generate a modified manifest file that includes a modified list of content streams corresponding to the selected content streams and the client-desired bit rate;
  provide the modified manifest file to the client device, wherein the plurality of content streams is ranked in order from a content stream associated with a highest bit rate to a content stream associated with a lowest bit rate.

18. The system of claim 17, wherein the processor is configured to execute the instructions to generate the modified manifest file by one of removing certain content streams from a list of content streams in the manifest file or adding additional content streams encoded at different respective bit rates than content streams listed in the manifest file.

19. The system of claim 17, wherein the instructions to monitor the one or more requests comprise instructions to identify a predetermined number of consecutive requests from the client device for a second content stream of the plurality of content streams ranked in a bottom half of a ranked listing.

* * * * *

UNITED STATES PATENT AND TRADEMARK OFFICE
CERTIFICATE OF CORRECTION

PATENT NO. : 10,819,764 B2
APPLICATION NO. : 15/948936
DATED : October 27, 2020
INVENTOR(S) : Brian Allan Heng It is certified that error appears in the above-identified patent and that said Letters Patent is hereby corrected as shown below:

In the Claims

Column 12, Line 57 Claim 17: "on the on the" should read --on the--.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*